(12) United States Patent  (10) Patent No.: US 8,702,063 B2
Degasne et al.  (45) Date of Patent: Apr. 22, 2014

(54) METHOD OF PULLING STRANDS OF A CABLE INTO A CONDUIT AND ASSOCIATED SYSTEM

(75) Inventors: Joel Degasne, Conches (FR); Mathieu Lemoine, Saconin Et Breuil (FR)

(73) Assignee: Soletanche Freyssinet, Rueil Malmaison (FR)

( * ) Notice: Subject to any disclaimer, the term of this patent is extended or adjusted under 35 U.S.C. 154(b) by 569 days.

(21) Appl. No.: 12/866,385

(22) PCT Filed: Dec. 5, 2008

(86) PCT No.: PCT/FR2008/052230
§ 371 (c)(1),
(2), (4) Date: Nov. 8, 2010

(87) PCT Pub. No.: WO2009/098416
PCT Pub. Date: Aug. 13, 2009

(65) Prior Publication Data
US 2011/0042630 A1   Feb. 24, 2011

(30) Foreign Application Priority Data

Feb. 7, 2008   (FR) ..................................... 08 50784

(51) Int. Cl.
H02G 1/08   (2006.01)
B63B 35/03   (2006.01)
B65H 59/00   (2006.01)

(52) U.S. Cl.
USPC ......... 254/134.3 R; 254/134.3 FT; 254/134.4

(58) Field of Classification Search
USPC .......................... 254/134.3 R, 134.3 FT, 134.4
See application file for complete search history.

(56) References Cited

U.S. PATENT DOCUMENTS

| 5,029,816 A | * | 7/1991 | Langston | .............. 254/134.3 FT |
| 5,788,222 A | * | 8/1998 | Kanel | .................. 254/134.3 FT |
| 6,916,992 B1 | | 7/2005 | Ortiz | |
| 2005/0184280 A1 | | 8/2005 | Rivers et al. | |

FOREIGN PATENT DOCUMENTS

| DE | 37 31 611 | 3/1989 |
| EP | 0 743 731 | 11/1996 |
| EP | 1 580 472 | 9/2005 |
| JP | 11-336987 | 12/1999 |

* cited by examiner

*Primary Examiner* — Lee D Wilson
*Assistant Examiner* — Seahee Yoon
(74) *Attorney, Agent, or Firm* — McKenna Long & Aldridge LLP

(57) ABSTRACT

The invention provides a method for pulling strands or sub-groups of strands of a multi-strand cable into a conduit (3). In accordance with this method, a strand or sub-group of strands (2) to be pulled into the conduit is conveyed from one end of the conduit to the other by the movement of a drive element (1) in tension, to which the strand or sub-group of strands is temporarily coupled. In addition, the drive element in tension is designed not to enter a bundle of previously installed strands.

31 Claims, 2 Drawing Sheets

METHOD OF PULLING STRANDS OF A CABLE INTO A CONDUIT AND ASSOCIATED SYSTEM

This application claims priority to International Application No. PCT/FR2008/052230 filed on Dec. 5, 2008, and French Application No. 0850784 filed Feb. 7, 2008 in France, all of which are hereby incorporated by reference in their entirety.

BACKGROUND OF THE INVENTION

The present invention relates to the pulling of strands of a cable into a conduit.

The pulling of strands of a cable into a conduit is commonly used in a certain number of fields. It is used, for example, although not exclusively, in the post-tensioned prestressed concrete technique, in order to install and then tension multi-strand cables in sheaths of circular cross-section previously incorporated into the concrete, in order to compress the structure.

The pulling is generally carried out with the help of a winch cable to which the strand or strands to be pulled are temporarily fixed.

For certain structures requiring a non-rectilinear prestressing line in particular, such as domes involving a line in the form of an inverted U for example, the conventional method for pulling strands is, however, unsuitable.

During the pulling of one or more fresh strands, it may happen that the winch cable enters the bundle of previously installed strands, in particular in certain non-rectilinear zones of the conduit. This is detrimental to the advance of the winch cable inside the conduit.

The winch cable may even become entangled in some of the previously installed strands. In this case, the separation of the winch cable and the strands may prove particularly complex.

In addition to these drawbacks, damage may also be caused to the previously installed strands on contact with the winch cable, which may for example culminate in the tearing off of any plastic sheath surrounding these strands.

A purpose of the present invention is to propose an improved method for pulling strands.

SUMMARY OF THE INVENTION

The invention thus proposes a method for pulling by strands or sub-groups of strands of a multi-strand cable inside a conduit. According to this method, a strand or sub-group of strands to be pulled is conveyed from a first to a second end of the conduit by movement of a drive element in tension to which the strand or sub-group of strands to be pulled is temporarily coupled. Moreover, the drive element in tension is designed not to enter a bundle of previously installed strands.

Because the drive element in tension does not enter the bundle of previously installed strands, the advance of this drive element inside the conduit is not impeded. Moreover, there is no longer a risk of entanglement between this drive element and the bundle of previously installed strands. The risk of damage to the previously installed strands through contact with the drive element is also reduced.

According to advantageous embodiments that can be combined in all conceivable ways:

the drive element in tension has sufficient dimensions and/or sufficient rigidity not to turn on itself or around the strand or sub-group of strands to be pulled;

the drive element has a transverse dimension adapted depending on at least one of: a dimension of the conduit, a line of the conduit, a total number of strands of the multi-strand cable and a diameter of the strands;

the drive element extends over the entire length of the conduit;

the strand or sub-group of strands to be pulled is arranged relative to the drive element in tension on the same side as the bundle of previously installed strands;

the strand or sub-group of strands to be pulled is temporarily coupled to the drive element by fastening to a shuttle fixed to the drive element;

the shuttle is designed not to enter the bundle of previously installed strands;

the drive element is pulled with the help of a first winch placed at the second end of the conduit;

the drive element is connected to a second winch placed at the first end of the conduit;

the drive element is tensioned by the traction exerted by the first winch and by a braking carried out by the second winch;

the conduit has a non-rectilinear line;

the conduit comprises a portion having a curvature of which the centre of curvature is situated lower than said portion of the conduit;

the conduit comprises a portion having substantially an inverted U-shape;

the drive element in tension has a substantially continuous and flat shape;

the drive element comprises at least one belt;

the drive element comprises a plurality of non-continuous elements arranged along a cable;

at least some of the non-continuous elements have an oblong or rounded shape;

the conduit comprises a portion having a curvature and the spacing between at least some of the non-continuous elements is chosen depending on the radius of curvature of said portion;

the drive element has a transverse dimension greater than 30% of a transverse dimension of the conduit;

the drive element has a transverse dimension substantially equal to 60% of a transverse dimension of the conduit; and/or after pulling and uncoupling of said strand or sub-group of strands, a following strand or sub-group of strands to be pulled is conveyed from the second to the first end of the conduit by movement of the drive element in tension to which the following strand or sub-group of strands to be pulled is temporarily coupled; successive strands or sub-groups can thus be pulled into the conduit by movement of the drive element, alternately in one direction and in the opposite direction.

The invention also proposes a system designed to use the method for pulling in sub-groups of strands of a multi-strand cable inside a conduit, mentioned above. This system comprises a drive element in tension suitable for conveying by movement, from a first to a second end of the conduit, a strand or sub-group of strands to be pulled that is temporarily coupled to it by coupling means. Moreover, the drive element in tension is designed not to enter a bundle of previously installed strands.

Other characteristics and advantages of the present invention will become apparent from the following description of non-limiting embodiments, with reference to the attached drawings.

DESCRIPTION OF PREFERRED EMBODIMENTS

An embodiment of the invention will now be described with reference to the figures.

In this example, the aim is to install a multi-strand cable inside a conduit. To do this, the strands intended to constitute the cable are pulled inside the conduit, one by one or in sub-groups of strands comprising the same number of strands or a different number of strands.

The cable in question is for example a prestressing cable intended to compress a concrete structure in which the conduit is incorporated. In this case, the strands constituting the cable can for example be metal braids comprising six peripheral wires twisted around a central wire, each braid optionally being covered by an individual plastic sheath.

The method for pulling strands that has just been described is of course also applicable to other types of cables and for other uses.

Figure 1:
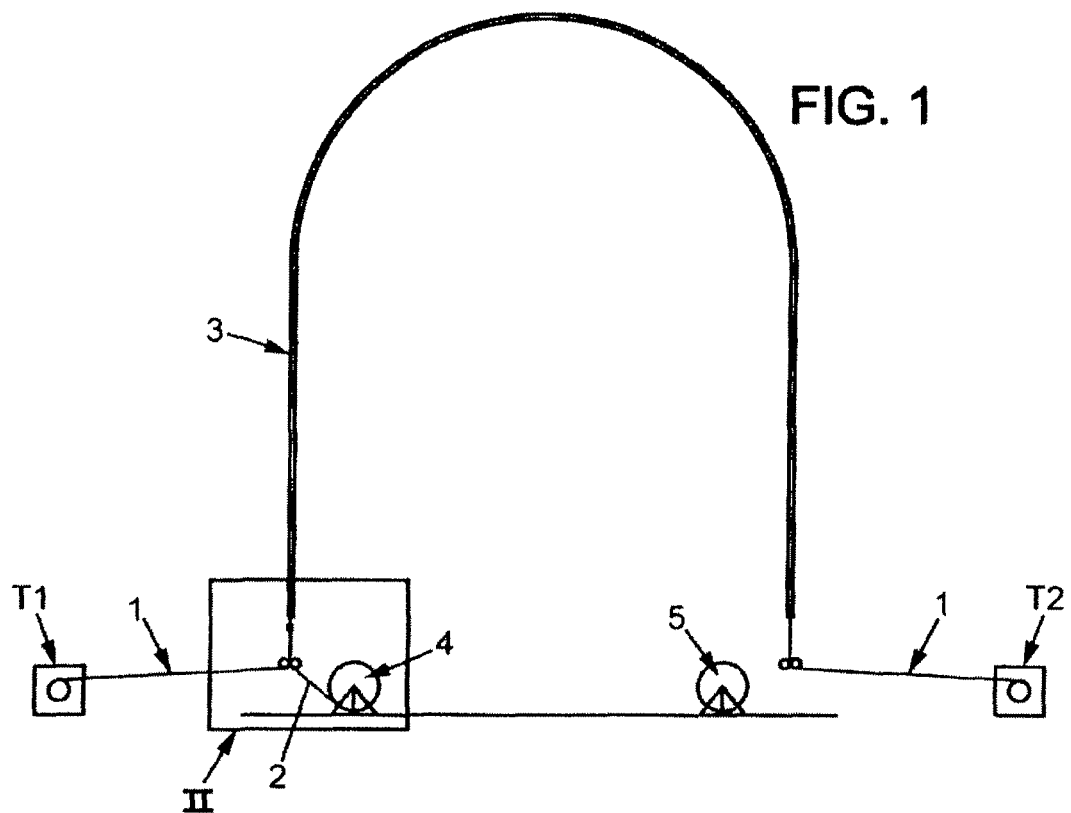
FIG. 1 is a diagram showing a non-limiting example of pulling by strands or sub-groups of strands of a multi-strand cable inside a conduit.

FIG. 1 shows a conduit 3 having an inverted U-shape. In other words, the conduit 3 has two vertical portions connected by a portion in the form of an arc of a circle the centre of which is situated lower than this arc. This conduit shape can be found for example in structures topped by a concrete dome, such as some nuclear buildings for example.

Other conduit shapes could also be considered, of course. By way of example, the conduit could comprise a portion having a curvature, other than an arc of a circle, the centre of curvature of which would be situated lower than said portion of the conduit. It could for example be a curvature in the form of an ellipse.

More generally, the conduit could have any type of non-rectilinear line, with for example angles or bends. It will also be noted that the invention would be equally applicable in connection with a conduit having a rectilinear line.

In the remainder of the description, a given moment during the installation of the cable is dealt with. At this moment, a certain number of strands are assumed to have previously been installed inside the conduit 3. These previously installed strands form a bundle (not shown) which extends inside the conduit 3 and is held against the bottom of the latter by gravity, in its portion in the form of an arc of a circle situated in the upper part of the inverted U.

Depending on the chosen moment of observation, the number of previously installed strands constituting the bundle can range from zero, right at the start of the installation of the cable, to the total number of strands constituting the multi-strand cable less the number of strands of the last strand or sub-group of strands to be pulled, at the moment preceding the last pulling of strands prior to completion of the installation of the cable.

At this moment of the installation of the cable, a fresh strand or sub-group of strands 2 is pulled in order to join the bundle of previously installed strands.

Initially, the strand or sub-group of strands 2 is advantageously wound on a reel 4. In this case, one end of this strand or sub-group of strands is taken from the reel in order to be temporarily coupled with a drive element 1 tensioned through the conduit 3 during the pulling operation.

In the example illustrated in FIG. 1, the drive element 1 is tensioned by the simultaneous action of a haulage winch T2 that pulls the drive element 1 towards it and a braking winch T1 that slows the advance of the drive element 1 towards the winch T2 through the conduit 3. Other ways of tensioning the drive element 1 can also be envisaged of course. This tensioning can for example be realized by a controlled retention of the strand or sub-group of strands 2 before it enters the conduit 3, for example at the reel 4.

The coordinated action of the winches T1 and T2 results in the movement of the drive element 1, kept in tension, inside the conduit 3 from the left end to the right end of this conduit (according to the configuration shown in FIG. 1).

Once the strand or sub-group of strands 2 is coupled to the drive element 1, it continues its advance through the entire conduit 3, until its end that had been introduced into the conduit on the left leaves this same conduit on the right, thus joining the bundle of previously installed strands.

The strand or sub-group of strands 2 can then be uncoupled from the drive element 1. It can then optionally be held towards the inside of the conduit 3 and anchored temporarily at its ends if necessary.

When the strand or sub-group of strands 2 is not the last one that has to be pulled into the conduit 3, the pulling of the following strands or sub-groups of strands can continue in similar fashion.

This subsequent pulling can be carried out from the right side of the conduit 3, using for example a reel 5 on which the next strand or sub-group of strands to be pulled is wound, then alternately from the left and right sides of the conduit 3, the winches T2 and T1 hauling and braking in turn. As a variant, the pulling can always take place from the left side of the conduit 3, for example by returning the drive element 1 "empty" to the left side of the conduit 3.

In the example illustrated in FIG. 1, the drive element 1 extends over the entire length of the conduit 3.

The drive element 1 in tension is designed not to enter the bundle of previously installed strands. It has a sufficient lift or floatability for this purpose.

The shape, dimensions, rigidity or further characteristic parameters of the drive element 1 can be chosen appropriately in order to prevent such entry into the bundle of previously installed strands.

According to an advantageous example, a transverse dimension of the drive element 1, such as its width, can be chosen depending on a transverse dimension of the conduit 3, such as its diameter or one of its diameters, or other dimensions of this conduit.

A width of the drive element 1 close to that of the diameter of the conduit 3 will prevent it from becoming entangled in the previously installed strands, including in the portion in the form of an arc of a circle of the conduit 3, where this drive element rests heavily on the bundle of strands, due in particular to gravity. However, too great a width of the drive element 1 could prevent the latter from moving inside the conduit 3 when the bundle of previously installed strands is large and occupies a majority of the cross-section of this conduit.

A compromise as regards the width of the drive element 1 can thus advantageously be sought, as will be apparent to a person skilled in the art, in order to prevent the drive element 1 from entering the bundle of previously installed strands, while still allowing for easy circulation of this drive element 1 inside the conduit 3, including when a large number of strands or sub-groups of strands have previously been installed.

A width of the drive element 1 greater than 30% of a transverse dimension, such as for example the smallest diameter, of the conduit 3 can be used. A value of around 60% of the diameter of the conduit 3 seems to be particularly appropriate.

Alternatively or additionally, the width of the drive element 1 can be chosen depending on the diameter of the strands. For example, the smaller the diameter of the strands constituting the cable to be installed, the larger the chosen width of the drive element 1 in tension can be, so as to prevent the previously installed strands from going around the drive element 1 and possibly becoming entangled with it.

Still additionally or alternatively, the width of the drive element 1 in tension can be adapted depending on the line of the conduit 3 and/or the total number of strands constituting the cable to be installed.

Likewise, the drive element 1 can advantageously be sufficiently rigid to avoid the risk of it being inserted between the strands of the bundle of previously installed strands. It can nevertheless be chosen sufficiently flexible to be able to move inside the conduit 3, including in its non-rectilinear portions, when it is tensioned. Here too, a compromise can be sought, as will be apparent to a person skilled in the art.

The different characteristic parameters of the drive element 1 can also be adjusted in relation to the tension exerted on this drive element.

Advantageously, the drive element 1 in tension has sufficient dimensions and/or rigidity, or also further characteristic parameters chosen so that it does not turn on itself or around the strand or sub-group of strands 2 to be pulled.

By preventing the drive element 1 from rotating on itself, its movement within the conduit 3 is not impeded, while maximum space is still preserved in the cross-section of this conduit for pulling fresh strands or sub-groups of strands. The resistance to the entry of the drive element 1 into the bundle of previously installed strands is thus increased.

By preventing the drive element 1 from rotating about the strand or sub-group of strands 2 to be pulled, their uncoupling, and thus any re-use of the drive element 1 to pull the following strands or sub-groups of strands, is facilitated.

The drive element 1 can have various shapes, provided that it has a sufficient lift per unit length to prevent it from entering the bundle of previously installed strands, when it is tensioned.

Advantageously, the drive element 1 in tension can have a substantially continuous and flat shape. It can for example be a textile or synthetic fibre strip, as is shown schematically in the example in FIG. 3.

The materials used for this drive element 1 can vary depending on requirements, in particular depending on the constitution of the previously installed strands. Thus, when the strands in question are braids surrounded by a plastic sheath, it may be advantageous to use a drive element comprising an identical or similar plastic material.

The materials can also be chosen to limit friction between the drive element 1 and the previously installed strands.

A belt can for example serve as such a continuous and flat drive element. A succession of belts placed end-to-end can also be considered, in particular if the length of the conduit 3 would make it difficult to use a single belt.

As a variant, the drive element can comprise a plurality of non-continuous elements distributed over its length. It can thus be a cable along which are arranged oblong or rounded elements, such as balls. In this latter case, the diameter of the balls, their spacing and also their mechanical properties, such as their rigidity, are advantageously chosen to prevent the cable from entering the bundle of previously installed strands. As regards the spacing between the strands, it is advantageously chosen depending on the radius of curvature presented by a curved portion of the conduit.

Figure 2:
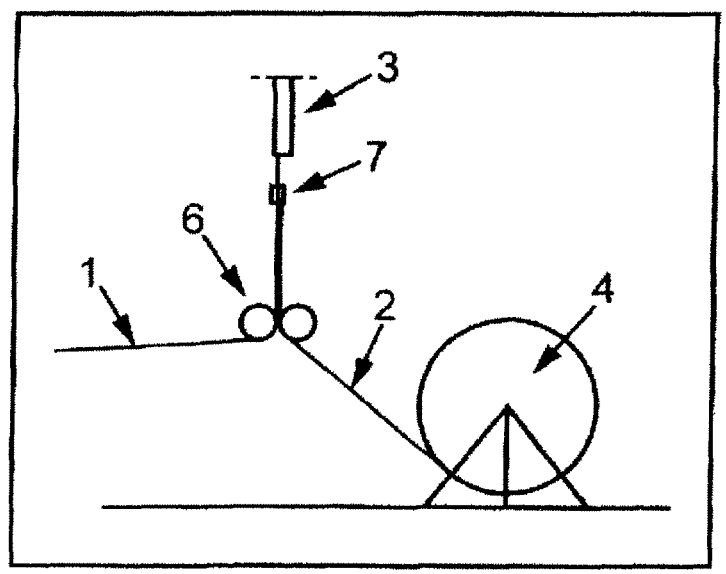
FIG. 2 is an enlarged diagram showing a detail present in the boxed area of FIG. 1.

FIG. 2 shows, enlarged, the detail enclosed in a box in FIG. 1 relating to the coupling, that is to say the junction, between the drive element 1 and the strand or sub-group of strands 2 to be pulled.

In this non-limiting example, the drive element 1 and the strand or sub-group of strands 2 to be pulled are delivered simultaneously from the winch T1 and the reel 4 respectively, by means of the traction exerted by the winch T2. Deflection rollers 6 allow for the drive element 1 and the strand or sub-group of strands 2 to be brought together in the same direction at the entry to the conduit.

One of the ends of the strand or sub-group of strands 2 is then temporarily coupled to the drive element 1, by means of a coupling device 7, an example of which will be described below with reference to FIG. 3. The coupling device 7 is for example situated towards the middle of the drive element 1, so as to be able to move between the two ends of the conduit 3 during the hauling of the drive element 1 by the winch T2 or the winch T1 alternately.

The coupling device 7 could of course be arranged differently depending on the configuration adopted. When the strand or sub-group of strands to be pulled 2 has been conveyed from the left end to the right end of the conduit 3 with the help of the drive element 1, the coupling device 7 comes out at the right end of the conduit 3, having travelled the entire length of the latter. By suitable handling of the coupling device 7, the drive element 1 and the strand or sub-group of strands 2 can then be uncoupled.

As is shown schematically in FIGS. 1 and 2, the strand or sub-group of strands 2 is advantageously positioned to the right of the drive element 1 before it enters the conduit 3. This strand or sub-group of strands 2 is thus situated on the same side as the bundle of previously installed strands, relative to the drive element 1.

In the example illustrated, the previously installed strands (not shown) are held against the bottom (towards the inside) of the conduit 3 by gravity, in its portion in the form of an arc of a circle situated in the upper part of the inverted U. Thus, the drive element 1, during its travel inside the conduit 3, is on top of the bundle of previously installed strands, as well as the strand or sub-group of strands 2 to be pulled upstream of the coupling device 7.

Through this arrangement, the strand or sub-group of strands 2 is brought directly onto the bundle of previously installed strands, without the need for further maneuvers. Moreover, once uncoupled from the strand or sub-group of strands 2, the drive element 1 can return in the opposite direction, by means of traction exerted by the winch T1, without modification of its relative position vis-à-vis the bundle of previously installed strands. Another possibility is to start another pulling operation in the opposite direction.

Figure 3:
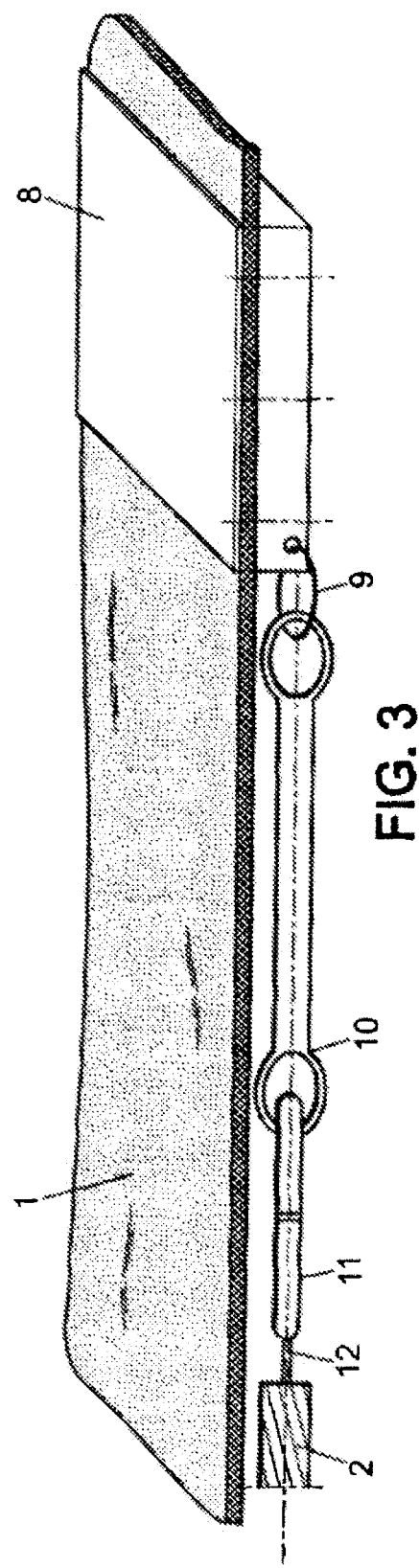
FIG. 3 is a diagram showing a non-limiting example of temporary coupling between a drive element and a strand to be pulled.

FIG. 3 shows a non-limiting example of a coupling device between a drive element 1 in the form of a belt, and a strand in the form of a braid 2, which comprises for example six peripheral wires twisted around a central wire 12.

The coupling device shown comprises a shuttle 8 fixed on the drive element 1. In this example, the shuttle is formed from two sheets, for example of metal, clamped against each other around the drive element 1.

The braid 2 to be pulled is fastened to this shuttle by appropriate means, which comprise, in the example illustrated in FIG. 3, a swivel 11 designed to fasten onto the central wire 12 of the braid 2, as well as a snap hook 9 connecting the swivel 11 to the shuttle 8 via a double loop cable 10. The closure of the snap hook 9 on a hole made in the shuttle 8 allows for coupling between the braid and the belt. Its opening allows for uncoupling.

Advantageously, the shuttle used itself has sufficient lift that prevents it from entering the bundle of previously installed strands. As is the case for the drive element 1, this can be realized in particular through the choice of shape, dimensions such as a width, rigidity or also of further appropriate characteristic parameters of this shuttle.

Other types of coupling device may also be suitable, of course, for providing a temporary coupling between a strand or sub-group of strands and the drive element, as will be apparent to a person skilled in the art.

The method and the system that have just been described thus allow for the installation of a multi-strand cable by successive pulling of the strands or sub-groups of strands intended to form this cable, so as to prevent any entry and thus any entanglement between the drive element of a fresh strand or sub-group of strands to be pulled with the bundle of previously installed strands.

This results in increased efficiency of the pulling of the strands or sub-groups of strands and thus easier, less costly and faster installation of the cable. This result is in particular, but not exclusively, achieved when the cable has to follow a non-rectilinear line, in which the drive element would tend to sink into the bundle of previously installed strands due to gravity and/or the line of the conduit, if it was not designed as provided for by the invention.

The invention claimed is:

1. A method for sequentially pulling strands or sub-groups of strands of a prestressing multi-strand cable inside a conduit, in which the strand or sub-group of strands to be pulled is conveyed from a first to a second end of the conduit and comes out at the second end by movement of a drive element in tension to which the strand or sub-group of strands to be pulled is temporarily coupled, the drive element in tension having a dimension chosen to prevent the drive element from entering a bundle of strands previously installed inside the conduit, the drive element also being pulled with the help of a first winch which is a haulage winch which allows an advance of the drive element placed at the second end of the conduit and connected to a second winch which is a braking winch which slows the advance of the drive element placed at the first end of the conduit, the drive element being tensioned by the traction exerted by the first winch and by a braking carried out by the second winch.

2. The method according to claim 1, in which the drive element in tension has sufficient dimensions and/or sufficient rigidity not to turn on itself or around the strand or sub-group of strands to be pulled.

3. The method according to claim 1, in which the drive element has a transverse dimension adapted depending on at least one of: a dimension of the conduit, a line of the conduit, a total number of strands of the multi-strand cable and a diameter of the strands.

4. The method according to claim 1, in which the drive element extends over the entire length of the conduit.

5. The method according to claim 4, in which the strand or sub-group of strands to be pulled is arranged relative to the drive element in tension on the same side as the bundle of previously installed strands.

6. The method according to claim 1, in which the strand or sub-group of strands to be pulled is temporarily coupled to the drive element by fastening to a shuttle fixed on the drive element.

7. The method according to claim 6, in which the shuttle is designed not to enter the bundle of previously installed strands.

8. The method according to claim 1, in which the conduit has a non-rectilinear line.

9. The method according to claim 8, in which the conduit comprises a portion having a curvature, of which the centre of curvature is situated lower than said portion of the conduit.

10. The method according to claim 9, in which the conduit comprises a portion having a substantially inverted U-shape.

11. The method according to claim 1, in which the drive element in tension has a substantially continuous and flat shape.

12. The method according to claim 11, in which the drive element comprises at least one belt.

13. The method according to claim 1, in which the drive element has a transverse dimension greater than 30% of a transverse dimension of the conduit.

14. The method according to claim 13, in which the drive element has a transverse dimension substantially equal to 60% of a transverse dimension of the conduit.

15. The method according to claim 1, in which, after pulling and uncoupling of said strand or sub-group of strands which remains inside the conduit, a following strand or sub-group of strands to be pulled is conveyed from the second to the first end of the conduit by movement of the drive element in tension to which the following strand or sub-group of strands to be pulled is temporarily coupled.

16. A system designed to implement a method for sequentially pulling strands or sub-groups of strands of prestressing multi-strand cable inside a conduit, the strand or sub-group of strands to be pulled is conveyed from a first to a second end of the conduit and comes out at the second end, the system comprising a drive element in tension suitable for conveying, by movement from a first to a second end of the conduit, a strand or sub-group of strands to be pulled that is temporarily coupled to it by coupling means, the drive element in tension having a dimension chosen to prevent the drive element from entering a bundle of strands previously installed inside the conduit, the drive element also being pulled with the help of a first winch which is a haulage winch which allows an advance of the drive element placed at the second end of the conduit and connected to a second winch which is a braking winch which slows the advance of the drive element placed at the first end of the conduit, the drive element being tensioned by the traction exerted by the first winch and by a braking carried out by the second winch.

17. The system according to claim 16, in which the drive element in tension has sufficient dimensions and/or sufficient rigidity not to turn on itself or around the strand or sub-group of strands to be pulled.

18. The system according to claim 16, in which the drive element has a transverse dimension adapted depending on at least one of: a dimension of the conduit, a line of the conduit, a total number of strands of the multi-strand cable and a diameter of the strands.

19. The system according to claim 16, in which the drive element extends over the entire length of the conduit.

20. The system according to claim 19, in which the strand or sub-group of strands to be pulled is arranged relative to the drive element in tension on the same side as the bundle of previously installed strands.

21. The system according to claim 16, in which the strand or sub-group of strands to be pulled is temporarily coupled to the drive element by fastening to a shuttle fixed on the drive element.

22. The system according to claim 21, in which the shuttle is designed not to enter the bundle of previously installed strands.

23. The system according to claim 16, in which the conduit has a non-rectilinear line.

24. The system according to claim 23, in which the conduit comprises a portion having a curvature, of which the centre of curvature is situated lower than said portion of the conduit.

25. The system according to claim 24, in which the conduit comprises a portion having a substantially inverted U-shape.

26. The system according to claim 16, in which the drive element in tension has a substantially continuous and flat shape.

27. The system according to claim 26, in which the drive element comprises at least one belt.

28. The system according to claim 16, in which the drive element has a transverse dimension greater than 30% of a transverse dimension of the conduit.

29. The system according to claim 28, in which the drive element has a transverse dimension substantially equal to 60% of a transverse dimension of the conduit.

30. The system according to claim 16, comprising means for, after pulling and uncoupling of said strand or sub-group of strands which remain inside the conduit, conveying a following strand or sub-group of strands to be pulled from the second to the first end of the conduit by movement of the drive element in tension to which the following strand or sub-group of strands to be pulled is temporarily coupled.

31. The system according to claim 16, further comprising a first winch placed at the second end of the conduit for pulling the drive element and a second winch placed at the first end of the conduit and to which the drive element is connected, the first winch and the second winch being arranged so that the drive element is tensioned by the traction exerted by the first winch and by a braking carried out by the second winch.

* * * * *